United States Patent
Alstad et al.

(10) Patent No.: US 10,616,356 B2
(45) Date of Patent: Apr. 7, 2020

(54) OPTIMIZATION OF ASYNCHRONOUS PUSHING OF WEB RESOURCES

(71) Applicant: RADWARE, LTD., Tel Aviv (IL)

(72) Inventors: Kent Douglas Alstad, Roberts Creek (CA); Shawn David Bissell, North Vancouver (CA); Jarrod Patrick Thomas Connolly, Vancouver (CA)

(73) Assignee: Radware, Ltd., Tel Aviv (IL)

( * ) Notice: Subject to any disclaimer, the term of this patent is extended or adjusted under 35 U.S.C. 154(b) by 502 days.

(21) Appl. No.: 15/052,322

(22) Filed: Feb. 24, 2016

(65) Prior Publication Data

US 2016/0248867 A1 Aug. 25, 2016

Related U.S. Application Data

(60) Provisional application No. 62/119,890, filed on Feb. 24, 2015.

(51) Int. Cl.
*H04L 29/08* (2006.01)
*H04L 29/06* (2006.01)

(52) U.S. Cl.
CPC .......... *H04L 67/26* (2013.01); *H04L 67/2852* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,307,052 B1 | 4/2016 | Alstad et al. | |
| 2002/0087797 A1* | 7/2002 | Adrangi | G06F 12/0888 711/133 |
| 2004/0243704 A1 | 12/2004 | Botelho et al. | |
| 2005/0108418 A1* | 5/2005 | Bedi | G06F 16/9574 709/232 |
| 2007/0067569 A1* | 3/2007 | Vittal | G06F 12/0804 711/118 |
| 2012/0096106 A1* | 4/2012 | Blumofe | G06Q 50/00 709/213 |
| 2014/0149531 A1 | 5/2014 | Chung et al. | |
| 2015/0012835 A1 | 1/2015 | Wong et al. | |
| 2015/0296047 A1 | 10/2015 | Ghazisaidi | |
| 2016/0248866 A1* | 8/2016 | Garas | H04L 67/32 |
| 2016/0285989 A1 | 9/2016 | Zhang | |

* cited by examiner

*Primary Examiner* — Philip J Chea
*Assistant Examiner* — Hassan A Khan
(74) *Attorney, Agent, or Firm* — M&B IP Analysts, LLC

(57) ABSTRACT

A system and method for optimization of resource pushing are presented. The method includes intercepting a current request for web content from a client device; determining a current PUSH list from at least one generated PUSH list based on the current request, wherein each generated PUSH list ensures availability of resources to the client device prior to receiving of a response, from an origin server, corresponding to the request; and pushing, in real-time, resources to the client device based on the determined PUSH list. Some embodiments also include a method and system for generating PUSH lists for optimizing asynchronous resource pushing.

14 Claims, 5 Drawing Sheets

OPTIMIZATION OF ASYNCHRONOUS PUSHING OF WEB RESOURCES

CROSS-REFERENCE TO RELATED APPLICATIONS

This application claims the benefit of U.S. Provisional Application No. 62/119,890 filed on Feb. 24, 2015, the contents of which are hereby incorporated by reference.

TECHNICAL FIELD

The present disclosure relates generally to mechanisms for pushing web resources from a server into a client browser cache, and more particularly to creation of optimal resource lists based on past responses and a context of a current user request.

BACKGROUND

The HTTP session PUSH mechanism allows for pushing resources (e.g., images, scripts, etc.) from a server into a client browser cache independently of the client's HTTP request. This pushing requires that the underlying browser and acceleration proxy are SPDY® capable and support the PUSH method for asynchronously sending resources to a client on a per page per session basis.

SPDY® is an open networking protocol for transporting web content with goals of reducing web page load latency and improving web security. This reduced latency is achieved by SPDY® via compression, multiplexing, and prioritization of webpage sub-resources across a single connection per client.

To accelerate delivery of resources to browsers, SPDY® protocol uses two mechanisms: Server Push, and Server Hint. The Server Push mechanism involves sending a resource directly to a client without first receiving a request for the resource. The Server Hint mechanisms involves providing a URL to a client device, thereby notifying the client device that the resource(s) associated with the provided URL will be necessary. In response to receiving the URL, the client device determines whether the URL is already stored in the client cache and, if it does not, the client device may request the resource associated with the URL from the server. Thus, the client device receives limited information about the resource(s) and only requests the resource itself if it is needed. T The PUSH mechanisms defined in SPDY® protocol can also be used as mechanisms for pushing resources to a client device using HTTP 2.0 protocol. That is, by implementing PUSH mechanisms, an HTTP 2.0 server can be configured to provide data for rendering a web page prior to browser examination of a response. The HTTP 2.0 protocol version further improves upon SPDY® by permitting multiplexing at different hosts simultaneously, thereby significantly increasing the speed of downloading multiple web pages or other Internet-based content.

Existing solutions for pushing content typically require either blindly supplying resource information to a client, or interacting with the client to determine exactly which resource(s) the client will need. Such solutions may waste computing resources and make resource delivery less efficient by supplying already cached resources, or by requiring significant communication between the server and client regarding potential resources to be sent.

Specifically, currently there is no proxy solution for determining, based on the context of the request, which resources should be pushed and according to which priority. That is, although PUSH mechanisms are supported by an HTTP 2.0 protocol, such mechanisms define only how to transport the resources. However, the HTTP 2.0 protocol and the SPDY protocol do not provide any mechanisms or techniques to optimize or further accelerate the delivery of resources by a proxy or an origin server.

Therefore, it would be advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for optimization of resource pushing. The method comprises intercepting a current request for web content from a client device; determining a current PUSH list from at least one generated PUSH list based on the current request, wherein each generated PUSH list ensures availability of resources to the client device prior to receiving of a response, from an origin server, corresponding to the request; and pushing, in real-time, resources to the client device based on the determined PUSH list.

Some embodiments disclosed herein also include a system for optimization of resource pushing. The system comprises a processing circuitry; and a memory, the memory containing instructions that, when executed by the processing circuitry, configure the system to: intercept a current request for web content from a client device; determine a current PUSH list from at least one generated PUSH list based on the current request, wherein each generated PUSH list ensures availability of resources to the client device prior to receiving of a response, from an origin server, corresponding to the request; and push, in real-time, resources to the client device based on the determined PUSH list.

Some embodiments disclosed herein further include a method for generating PUSH lists for optimizing asynchronous resource pushing. The method comprises capturing a plurality of responses and corresponding requests for web content; identifying at least one resource associated with each captured response; and generating, for each captured response, at least one PUSH list based on the associated at least one resource, wherein each PUSH list includes metadata for identifying resources associated with the captured response.

Some embodiments disclosed herein further include a system for generating PUSH lists for optimizing asynchronous resource pushing. The system comprises a processing circuitry; and a memory, the memory containing instructions that, when executed by the processing circuitry, configure the system to: capture a plurality of responses and corresponding requests for web content; identify at least one resource associated with each captured response; and generate, for each captured response, at least one PUSH list based on the associated at least one resource, wherein each PUSH list includes metadata for identifying resources associated with the captured response.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
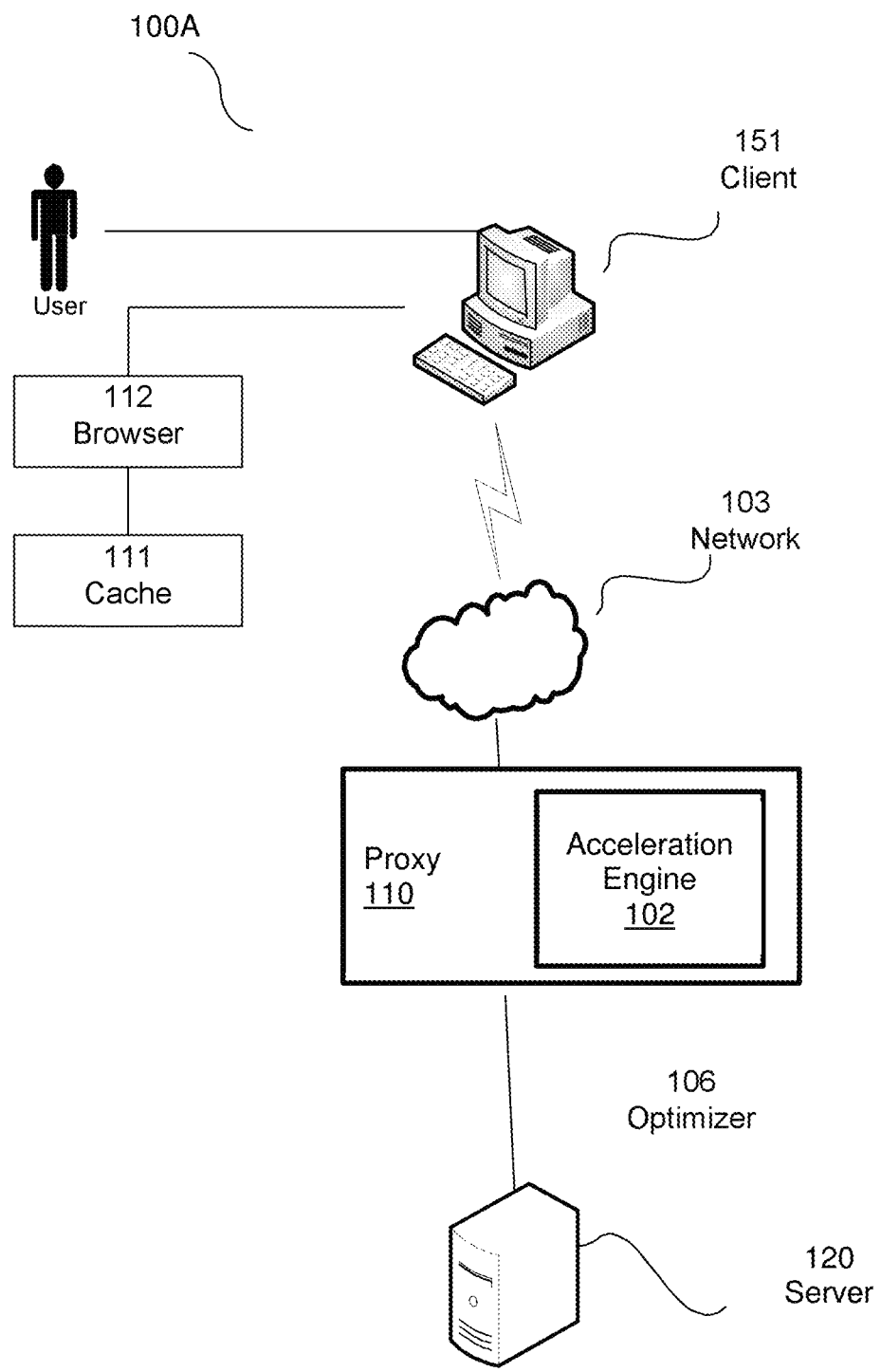
FIG. 1A depicts an architecture for deploying the acceleration engine in a proxy according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for optimizing asynchronous resource pushing. The optimization techniques can be implemented by a web proxy communicatively connected between a client device and origin server (e.g., a web server). The optimization techniques can also be implemented by the origin server.

FIG. 1A shows an exemplary architecture 100A for deploying a proxy for optimizing asynchronous pushing of web resources according to the disclosed embodiments. As depicted in FIG. 1A, in such a configuration, a proxy 110 including an acceleration engine 102 is positioned between a server 120 and a client device (client) 151. The server 120 may be an HTTP server, web server, or any other server. The client device 151 may be an HTTP client or any other electronic device capable of sending and receiving content over a network 103. The network 103 may be the Internet or any other network that enables communication among two or more electronic devices. The network 103 may be implemented using well-known network protocols such as hypertext transfer protocol (HTTP), HTTP 2.0, secure hypertext transfer protocol (SHTTP), transmission control protocol/Internet protocol (TCP/IP), and the like. In some embodiments, secure access to the network 103 may be facilitated via well-known techniques such as a Virtual Private Network (VPN), although such secure access is not required.

The client device 151 may be a computer or any other electronic device. Examples include, without limitation, a desktop computer, laptop computer, personal digital assistant (PDA), cellular telephone, smartphone, music player, handheld computer, tablet computer, kiosk, game system, enterprise computing system, server computer, and the like. In one embodiment, the client device 151 includes a local cache 111, which can be used for storing resources retrieved from the server 120 for later use. The cache 111 can be implemented at the client 151 according to well-known methods.

In one embodiment, the client 151 and/or server 120 each include a number of hardware components as are well known to those skilled in the art, including for example one or more input devices (such as a keyboard, mouse, touchscreen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 1A for clarity.

One skilled in the art should recognize that the particular arrangement of hardware elements shown in FIG. 1A is merely exemplary, and that the disclosed embodiments can be implemented using different hardware elements configured in any of a number of different ways. Thus, the particular architecture shown in FIG. 1A is merely illustrative and is not intended to limit the scope of the invention in any way.

One skilled in the art should recognize that any number of devices, singly or in any combination, may be configured to fulfill the roles of the client device 151 and/or the server 120 described herein without departing from the scope of the disclosed embodiments.

In one embodiment, the client 151 operates under the direction and control of a user, who interacts with the client 151 via a user interface according to well-known techniques. The client 151 may run a web browser 112 and/or another software application for enabling network communications. For illustrative purposes, the disclosed embodiments are described herein in terms of a request for a web page issued by browser 112 running on the client 151. In one embodiment, the cache 111 is associated with the browser 112, although the cache 111 can be separate from the browser 112 and can be any local cache for use by the client 151.

The user interacts with the client 151, for example by typing URLs and/or clicking on links within the browser 112. In response to such actions, client 151 makes requests of resources from the server 120. The proxy 110 acts as an intermediary between the client 151 and the server 120, and may be configured using the acceleration engine 102 to accelerate the content rendering on the browser 112. The acceleration is achieved by generating optimized PUSH lists and pushing resources to the client 151 prior to obtaining of such resources from the server 120.

In an embodiment, the acceleration engine 102 operates in two modes: a learning mode, and an acceleration mode. In the learning mode, based on a schedule, HTTP requests and related response pairs are intercepted, captured, and analyzed. Based on the analysis, PUSH lists are generated and maintained. Each PUSH list may be associated with a particular request or a context of a request (identified by an index), and may include metadata utilized to retrieve resources needed for a response to the serve request and/or for responses to related requests. In an embodiment, the PUSH lists may be optimized by prioritizing resources for each request based on logical criteria.

In one embodiment, request-response pairs across users for each request are captured and recorded by the acceleration engine 102. In effect, capturing permits classification of all requests such that, upon analysis of multiple captures, a PUSH list can be created and maintained containing a common list of resources previously required across multiple clients' requests. This PUSH list ensures that, for any request to a website hosted by the server 120, a list of resources may be made available. As a result, for future requests, the list of resources can be pushed, to the client 151, asynchronously and in an optimized order.

In an embodiment, the acceleration engine 102 implements a tracking subsystem (not shown). In this embodiment, the acceleration engine 102 is configured to track the likely contents of each client cache 111. As each client session begins, the acceleration engine 102 tracks the population of the contents of the client cache 111 by storing a representation of the client cache 111. The representation includes contents that are likely in the client cache 111.

In an embodiment, the contents in the representation may be inferred based on a page transition map and resources commonly contained on the navigation path taken by the current session. A page transition map is a database of 'from-to' URL contexts (URL+Important Headers) that represents the path each user takes through a given web site. Page transition data is collected across clients to determine which resources are likely to be in a particular client's cache 111 given their respective current pages and paths through the site. In an embodiment, a transition map is optionally used, by the acceleration engine 102, to help determine which resources have likely previously been pushed to the client 151 respective of the index and likely previous pages. The transition map data allows for determining the likelihood of a resource having already been transmitted and cached by a given client session.

In another embodiment, the contents in the representation may be inferred based on a persistent client in a cookie containing a Bloom filter for the current session and for previous sessions. In such an embodiment, a Bloom filter data structure is created for each user session. When determining whether a resource on a given PUSH list should be sent to the client in a given session, the Bloom filter is applied by the acceleration engine 120.

Specifically, when applying the Bloom filter, if a fixed length hash of the full resource URL passes the Bloom filter, that resource is sent. As responses are sent to each client session, the Bloom filter of each session is updated with the hash value of the URL. After each HTML or client side data request is completed, all values of resource URLs known to be related to that response may be added to that session's Bloom filter. The Bloom filter can therefore be used to effectively predict the likelihood of a resource being present in a HTTP response cached in the cache 111.

In yet another embodiment, the representation may include contents that are likely to be contents of the client cache 111 stored in a database (not shown). In a further embodiment, a client key such as, e.g., a universally unique identifier (UUID) may be stored as a client cookie. The stored client cookie may be used to index a database record containing the client cache 111, where the database record may be utilized by the acceleration engine 102. This indexing minimizes client storage requirements but may increase accelerator (server side) resource consumption.

In one embodiment, the acceleration engine 102 can be implemented as a software-based component of the proxy 110. Accordingly, the proxy 110 may include a processing system (not shown) for performing the tasks of the acceleration engine 102 in accordance with software and/or firmware instructions.

According to some embodiments, the acceleration engine 102 can be implemented as a hardware component. Examples for hardware component include general-purpose microprocessors, multi-core processors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, or any other suitable entities that can perform calculations or other manipulations of information.

Figure 1B:
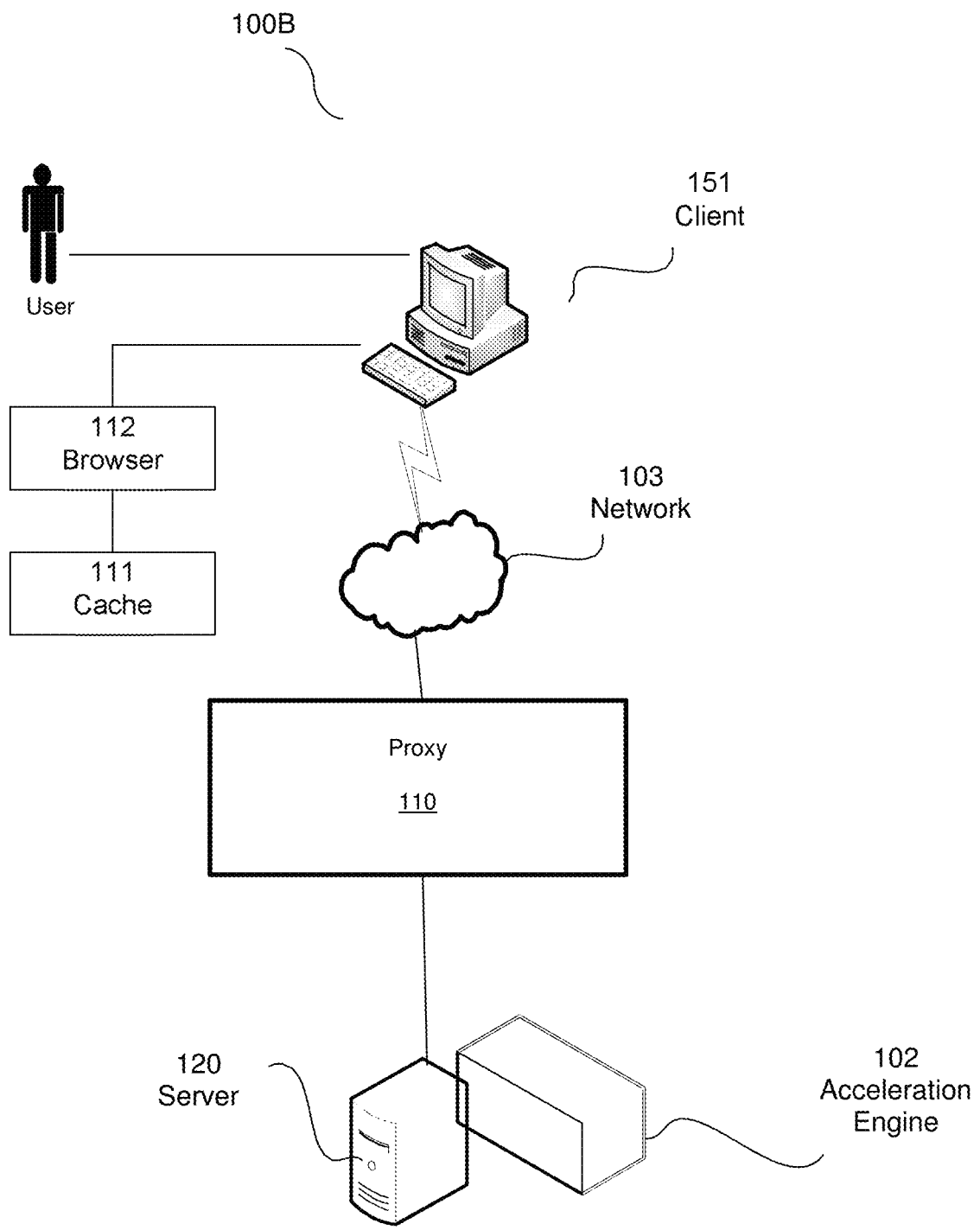
FIG. 1B depicts an architecture for deploying the acceleration engine in an origin server according to one embodiment.

FIG. 1B shows an exemplary architecture 100B for deploying the acceleration engine 102 in the server 120 according to an embodiment. One skilled in the art should recognize that the disclosed techniques can be implemented in an acceleration engine 102 or other component having any suitable location within the overall network architecture, and that the particular arrangements shown in FIGS. 1A and 1B are merely exemplary. For example, the acceleration engine 102 can be implemented as part of a stand-alone network appliance located in the communication path between the client 151 and the server 120. The acceleration engine 102 can also be implemented using any number of network appliances and/or other components in any suitable combination.

Figure 2:
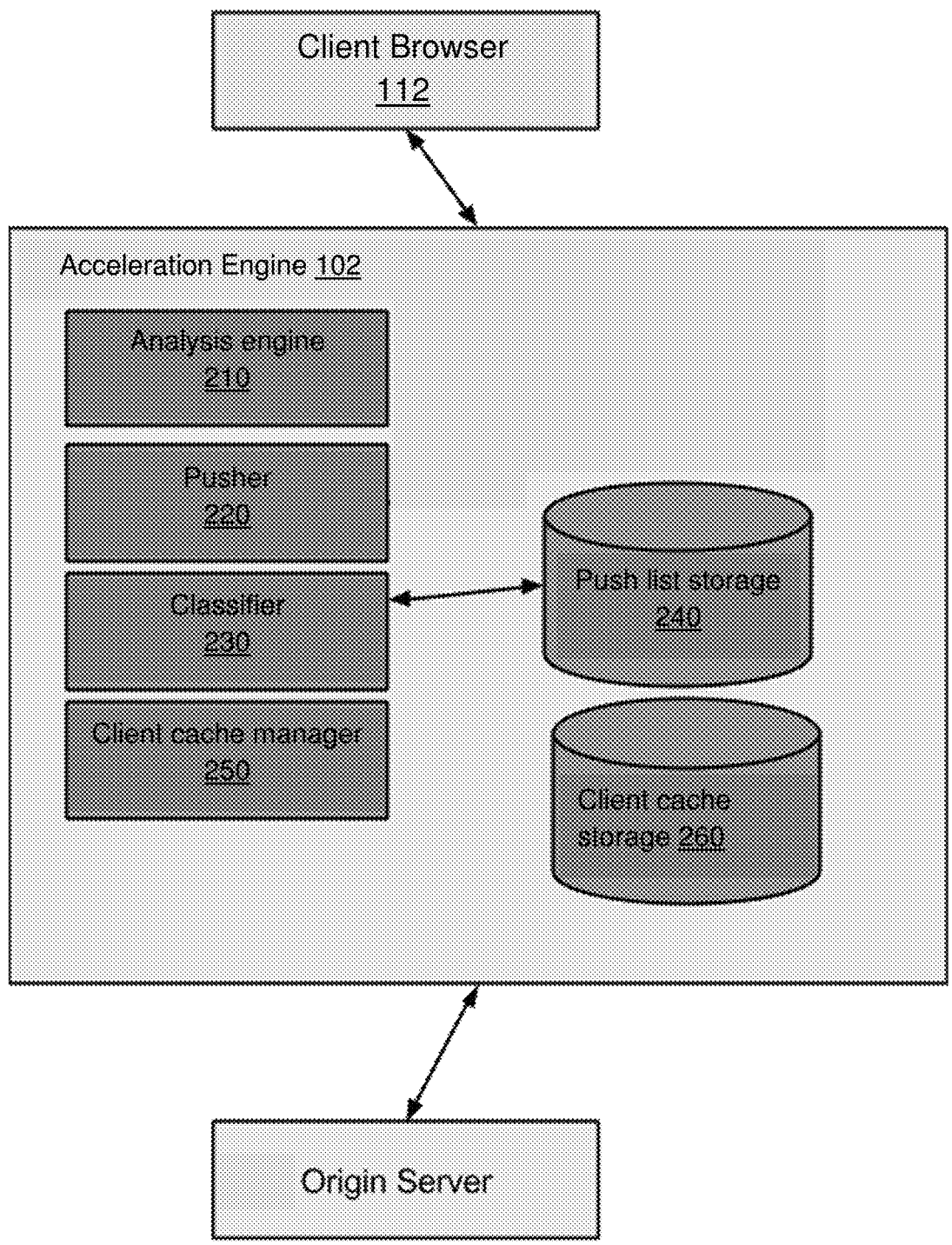
FIG. 2 is a block diagram illustrating the operation for the acceleration engine according to an embodiment.

FIG. 2 is an exemplary and non-limiting schematic diagram illustrating the operation of the acceleration engine 102 for optimizing asynchronous resource pushing according to an embodiment. In this embodiment, the acceleration engine 102 may push resources from an origin server (e.g., the server 120) to a browser of a client (e.g., the browser 112 of the client 151). The resources may include HTML documents, images, cascading style sheets (CSS), scripts, or any resources that are typically included in web-pages.

The acceleration engine 102 includes an analysis engine 210, a pusher 220, a classifier 230, a push list storage 240, a client cache manager 250, and a client cache storage 260.

In various embodiments, the analysis engine 210 is configured to analyze each captured request-response pair by causing classification of the request and/or by parsing the response for required resources or portions thereof. In an embodiment, the analysis may be performed off-line. When a resource is discovered in the response, that resource is added to a persisted list of resources required by a given HTTP request. In addition to the server side analysis of the captured response, instrumentation code may optionally be injected into the response. The injected code may identify and transmit a list of encountered resources to the origin. This instrumentation code may be added to the periodically captured user responses and the resultant resource list data is optionally combined with the list generated in the server side analysis process.

In one embodiment, the classifier 230 is configured to create indexes (or compound keys) based on data contained in or the context of requests received from the client. An index is used to identify PUSH list or lists for purposes of storage to and retrieval from the storage 240. Any data in a client's request including, for example, URL, HTTP headers, and/or the like, can be incorporated into a generated index.

In an embodiment, the classifier 230 is pre-configured with a classification file. The classification file defines headers in the request, URL, or portions thereof that uniquely define a class of responses that the acceleration engine 120 has encountered while analyzing previous pairs of requests and response. The classifier 230 analyzes incoming requests based on the contents of the classification file to generate the index. A generated index means that there is at least one PUSH list that includes resources that can be pushed immediately to the client for the received request. In a learning mode, the generated indexes are saved with their respective PUSH lists for later retrieval. An embodiment of the classifier 230 for generating indexes can be found in a co-pending U.S. patent application Ser. No. 12/426,909, assigned to the common assignee, the contents of which are hereby incorporated by reference.

Because a PUSH List represents responses related to previously analyzed requests, the responses may be maintained across user sessions and across users. When a resource is encountered in one user session but not in another, the resource may be removed from a 'common' PUSH list used across users. PUSH lists can be maintained either across users or for each unique user or user role in the system. PUSH lists are typically stored in the push list storage 240 along with their associated requests and/or classifications.

In addition, the analysis engine 210 may optionally be configured to filter each PUSH list to exclude off screen media resources. Such off screen media resources are not required for the rendering of the on screen page and do not accelerate the page rendering process when pushed. Moreover, if off screen resources are pushed, they compete with on screen resources for valuable bandwidth and may result in slower rendering times. Consequently, filtering out off screen media resources may reduce computing resource usage and/or accelerate pushing.

Various logical criteria may be used to order resources pushed based on the PUSH List. It should be understood by one skilled in the art that the order in which these criteria is applied can be designed for each request so as to obtain optimal results therefore. In an embodiment, the order criteria may be combined and/or excluded as desired. Such logical criteria may include, but are not limited to, assigning low priority to elements associated with non-blocking input/output (I/O) behavior, ordering based on response media types, prioritizing above-the-fold resources, combinations thereof, and so on.

One logical criterion that may be used would be to assign a low priority to any HTML elements flagged as 'async,' 'defer,' or that are otherwise known to result in non-blocking input/output (I/O) behavior. In an embodiment, such low priority HTML elements should only be pushed if server response generation is very slow and all other related resources have already been pushed.

Another logical criterion that may be used would be to use an order of response media types. An exemplary and non-limiting order may be: "text/html, text/css, application/javascript, application/x-javascript, text/javascript, Image/." Such an order may be used to order resources of otherwise equal weight. This exemplary list demonstrates favoring screen rendering above other activities, and is not necessarily complete.

Yet another logical criterion that may be used would be to assign higher priority to above-the-fold resources than to below-the-fold resources. Above-the-fold resources are resources that are included in portions of a web page that are visible without scrolling. In contrast, below-the-fold resources are not initially visible in the web page and require scrolling to be viewed. Such below-the-fold resources may be required later than the above-the-fold resources, or may not be required at all (i.e., if a visitor to the web page never scrolls).

In an embodiment, the manner in which resources are pushed to the client browser may be tailored dynamically depending on the context of the response, a current load, and a given connection at the time of each push. Upon receiving a request from a client with a URL that matches a predefined text pattern (such as, e.g., .html, .aspx, jsp, php, or .htm), the URL is investigated and the associated PUSH list may be determined.

In an embodiment, the pusher 220 may operate in a loop that is unique for each session context. The pusher 220 may push resources based on the order of the PUSH list. While the response is being generated and transmitted, the pusher 220 may be configured to iterate a PUSH list based on one or more iteration criteria. Iteration criteria may include, but are not limited to, determining whether a client cache tracking mechanism (such as, e.g., a Bloom filter or Page Transition Map) indicates that the resource is already in the client cache and, if so, skipping to the next resource.

Iteration criteria may also include determining whether the item is likely to be transferred to the client in time to improve the rendering experience of the client page and, if not, skipping to the next item. The likelihood of improved performance may be based on, but is not limited to, the client's connection speed, a connection latency, a resource type, a file size, and historical client improvement scores. Iteration criteria may further include determining whether the resource blocks client rendering and, if so, pushing and adding the resource to the Bloom filter.

When the client cache manager 250 indicates that the client browser is associated with a warm cache (i.e., a cache containing resources), the pusher 220 may begin by pushing a set of 'blocking resources' to the client and then waiting for a predetermined round-trip time. If there are no cancelled streams during the predetermined round-trip time, the pusher 220 may push the data related to the promises (i.e. completing the 'push promise').

Another optimization that may be performed by the pusher 220 is to push resources that are associated with 'in-lined' element data in a web page. The in-lined element data may be replaced with a reference to the pushed resources. This replacement may result in smaller HTMLs and faster binary resource transmission of in-line elements.

In an embodiment, the analysis engine 210 is configured to generate and utilize optimized PUSH lists for pushing resources to the client. Each PUSH list may include, but is not limited to, metadata required to generate a sequence of resources required by a requested web page or by a related web page (i.e., such that the resources of the related web page may be required imminently). The metadata may be associated with a particular web page and/or context of a request, and may indicate resources required by the web page and/or by contextually related web pages. In another embodiment, the analysis engine 210 may be configured to filter the PUSH lists, thereby removing resources that likely do not need to be pushed. In a further embodiment, the analysis engine 210 may be configured to optimize PUSH lists for particular requests and/or contexts of requests. The optimized PUSH lists are ordered so as to prioritize among resources being pushed, thereby conserving computing resources and accelerating rendering of web content.

In an embodiment, the acceleration engine 102 may be configured to receive captured requests and associated responses. In a further embodiment, the captured requests and responses may be captured by a client device. A request may include, but is not limited to, a uniform resource locator (URL) of a web page selected by a user of the client device. The associated response may be content in the web page associated with the selected URL, including any resources. The resources may be, but are not limited to, documents, files, multimedia content, services, combinations thereof, portions thereof, and any other web resources.

In an embodiment, generation of PUSH lists may be performed by the acceleration engine 102 based on the captured requests and associated responses. In particular, the acceleration engine 102 may analyze the captured requests and associated responses to identify resources related to each request. Based on the analysis, PUSH lists including at least the identified resources may be created. Each PUSH list may be further organized based on one or more order criteria. The order of the PUSH lists provides an order in which resources should be pushed to the client device for a particular request. The order criteria may include logical criteria for prioritizing resources such as, but not limited to, assigning low priority to non-blocking I/O behavior, assigning relative priorities of different types of media, assigning higher priority to above-the-fold resources, and so on.

In another embodiment, each PUSH list may be filtered to remove associations with resources that are not likely to be needed imminently. The filtering may include, but is not limited to, removing resources related to a request or context that are not encountered during every user session, removing off screen resources, and so on. The resources may further be filtered based on tracking of a session (by, e.g., a tracking engine). The tracking-based filtering may include determining whether particular resources are used in one session but not in another session by the same or other users for the request or context. The off screen resources include resources that are not shown in the initial display of the web page and, consequently, are not needed during initial rendering.

In another embodiment, the acceleration engine 102 may be configured to utilize the created PUSH lists upon intercepting a request between the client browser and the origin server. The PUSH lists may be utilized to determine which resources to push to the client browser based on the request. In a further embodiment, a context of the request may be determined, and a PUSH list featuring related resources may be utilized for pushing. For example, if the request includes the URL "www.soccerplayers.com," a PUSH list related to soccer content may be utilized.

In a further embodiment, the client cache manager 250 may be configured to determine cache contents likely to be in a client cache for the client browser. To this end, the client cache manager may be configured to begin tracking cache contents when a session begins. Based on the tracking, the client cache manager 250 is configured to generate and/or update a representative cache including the likely cached contents. The likely cached contents may be determined based on, but not limited to, navigations by a user of the client browser during the current session, Bloom filters for current and/or previous sessions, a client cache history from the acceleration engine 102, and the like. The client cache history may be stored in the client cache storage 260.

Determining likely cached contents based on navigations by a user of the client browser may include utilizing page transition maps to identify resources that are likely cached by the client browser given a current web page and/or navigation path through a website. Each page transition map may indicate "from-to" URL contexts (i.e., URLs with associated HTTP headers) representing the previously taken navigation paths through a given website. Page transition data from previous sessions may be collected across users, thereby allowing for determination of likely cached contents based on a current user's navigations during a session. Contents may be likely to be cached based on a particular navigation path if, e.g., the collected page transition data indicates that a number or proportion of client devices having the contents cached after following the navigation path is above a predefined threshold. The navigation paths through a website may be identified by the client cache manager 250 and stored in the client cache storage 260.

Determining likely cached contents based on Bloom filters may include creating a Bloom filter for each browsing session of a client. As responses are sent during each session, that session's Bloom filter is updated with hash values of URLs associated with the responses. A Bloom filter is a space-efficient probabilistic data structure that is used to test whether an element is a member of a set. False positive matches are possible when using a Bloom filter, but false negatives are not. Thus, a Bloom filter is characterized by a 100% recall rate. Bloom filters may be used, for example, to accelerate performance by quickly determining if data is part of a set and, upon determining that the data is not part of a set, removing requests for the data from any potential database queries.

For purposes of determining likely cached contents, the Bloom filter may be utilized to determine whether a URL in a request belongs to a set including content that is not likely cached. If a fixed length hash of the full URL of a resource passes the Bloom filter, it is determined that the resource is not likely cached, and the resource may be sent to the client browser. The Bloom filter may be further stored in the client cache storage 260 and used for requests by the client browser during subsequent sessions.

In an embodiment, the acceleration engine 102 may further be configured to utilize generated PUSH lists to optimize asynchronous resource pushing dynamically during client browsing sessions. Upon intercepting a request from the client browser to the origin server, the acceleration engine 102 may be configured to identify a URL of the request and to determine a PUSH list based on a context of the identified URL. In a further embodiment, the URL may only be identified if it includes a predefined file extension such as, but not limited to, ".html," ".aspx," "isp," "psp," ".htm," and the like. The context may indicate resources associated with a response and/or with related responses.

Before the origin server provides a response to the request, the acceleration engine 102 is configured to push, via the pusher 220, resources of the PUSH list to the client browser in a prioritized sequence. The prioritized sequence may be based on order criteria for the response and/or for contextually related responses. The number of resources pushed may depend on the speed of the connection between the client browser and the origin server as well as the time for generating a response by the origin server. In a further embodiment, the pusher 220 may be configured to iteratively push resources in the PUSH list.

In yet a further embodiment, the iterative pushing may further include determining, during each iteration (i.e., for each resource to be pushed), whether the resource should be pushed and/or added to a Bloom filter. Determining whether a resource should be pushed may include, but is not limited to, determining whether cache tracking (e.g., via a Bloom filter or Page Transition Map) for the client indicates that the client cache already contains the resource, determining whether a likelihood of performance improvement is above a predefined threshold, and the like. The likelihood of performance improvement may be determined based on, but not limited to, a connection speed, a connection latency, a resource type, a file size, historical improvement scores, combinations thereof, and so on. It may be determined that the resource should be added to a Bloom filter if, e.g., the resource blocks rendering by the client browser.

In another embodiment, the pusher 220 may optionally be configured to push blocking resources to the client browser and wait for a predetermined round-trip time. If, after the round-trip time, there are no cancelled streams, the pusher 220 may be configured to push other resources of the PUSH list.

In yet another embodiment, the pusher 220 may be configured to push resources of in-lined data elements of a web page to the client browser, and the in-lined data elements may be replaced with a reference to the pushed resources, thereby decreasing the size of the file and allowing for faster transmission of such in-lined element resources. Such in-lined data elements may include, for example, images, JavaScript, and/or CSS styles.

The acceleration engine 102 may further be configured to store, in the push list storage 240, multiple PUSH lists for each web page, request, and/or context. In a further embodiment, which PUSH list should be used for a particular request may be determined based on, but not limited to, client session cookies. As an example, different PUSH lists may be used for landing pages, non-landing pages, and internal pages.

A landing page list is used when the client cookie is not present and the referrer is from an external domain. This indicates that this is a first time cold cache view from an external location (i.e., the start of a cold cache session). A session may start as a cold cache session if the client cache likely does not contain any cached resources. In this case, it is assumed that the client cache is empty and the Bloom filter for the session is initialized.

A non-landing page list is used when the client cookie is present and the referrer is from an external domain (i.e., the start of a warm cache session). A session may start as a warm cache session if the client cache likely contains cached resources. In this case, the client's last known Bloom filter is read and transmitted from a local storage database of the client. This enables cache accuracy across sessions.

An internal page list may be used when the client cookie is present and the referrer is from an internal domain (i.e. a mid-session page request). This list is optionally filtered based on the client cache storage 260. In an embodiment, the client cache storage 260 may include a page transition map as described further herein above. In this case, resources that have been push on previous pages are removed from the list.

According to an embodiment, the acceleration engine 102 includes a processing unit (not shown) coupled to a memory (not shown). The processing system may comprise or be a component of a processor (not shown) or an array of processors coupled to the memory. The memory contains instructions that can be executed by the processing unit. The instructions, when executed by the processing unit, cause the processing system to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. Further, any component of the acceleration engine 102 can be implemented as a processing system defined above.

It should be noted that FIG. 2 is described herein above with respect to a single client device merely for simplicity purposes and without limitation on the disclosed embodiments. Additional client devices may be utilized without departing from the scope of the disclosure.

It should be further noted that FIG. 2 is described herein above with respect to an independent acceleration engine 102 merely for simplicity purposes and without limitation on the disclosed embodiments. The acceleration engine may be included in or communicatively connected to a server and/or proxy (e.g., as described with respect to FIGS. 1A-1B herein above) without departing from the scope of the disclosure.

Figure 3:
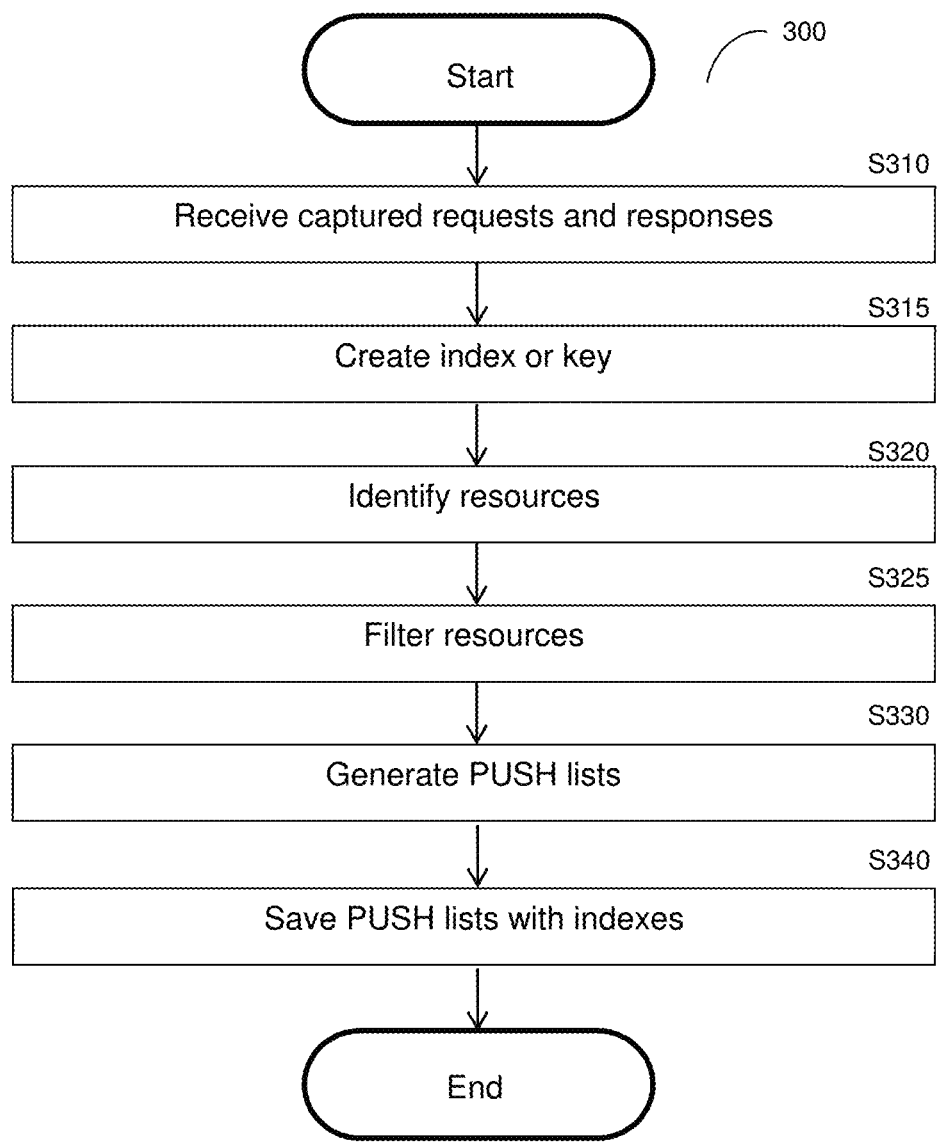
FIG. 3 is a flowchart illustrating a method for creating an optimized list for asynchronous resource pushing according to an embodiment.

FIG. 3 is an exemplary and non-limiting flowchart 300 illustrating a method for generating an optimized PUSH list according to an embodiment. In an embodiment, the method may be performed by an acceleration engine (e.g., the acceleration engine 102) during a learning mode or period.

At S310, pairs of requests and corresponding responses are captured. Each request includes at least a URL of a web page and each response includes one or more resources of the web page. The captured requests and responses may be across clients (i.e., the requests were made by different clients), or may be for a single client. The resources may be, but are not limited to, images, script files (e.g., JavaScript), CSS, videos, XMLHttpRequest (XHR) responses, and the like. At S315, each request is analyzed to create an index or a classification key. In an embodiment, indexes (or compound keys) are created based on data contained in or the context of requests received from the client. As noted above, the indexes may be created in part based on pre-defined URLs and/or headers.

At S320, the resources of the response are identified. In optional S325, the identified resources may be filtered. The filtering may include, but is not limited to, removing resources that were not utilized for every request belonging to the same context, removing off screen resources (i.e., resources that are not displayed on screen initially during rendering), and so on.

At S330, at least one PUSH list including the identified resources is generated. The PUSH list generation may include generating metadata for retrieving the identified resources. The PUSH list may exclude metadata for any filtered out resources. Each PUSH list may be associated with a request or context, and may only include identified resources of responses to those requests or requests belonging to the context.

In an embodiment, multiple PUSH lists may be generated for each request and/or context. In a further embodiment, which PUSH list should be used for a particular request may be determined based on, but not limited to, client session cookies. As an example, different PUSH lists may be used for landing pages, non-landing pages, and internal pages. Utilizing different PUSH lists for different situations is described further herein above with respect to FIG. 2.

At S340, each generated PUSH list is saved with a respective index (generated at S320). The index is used for a later retrieval of the PUSH list.

Figure 4:
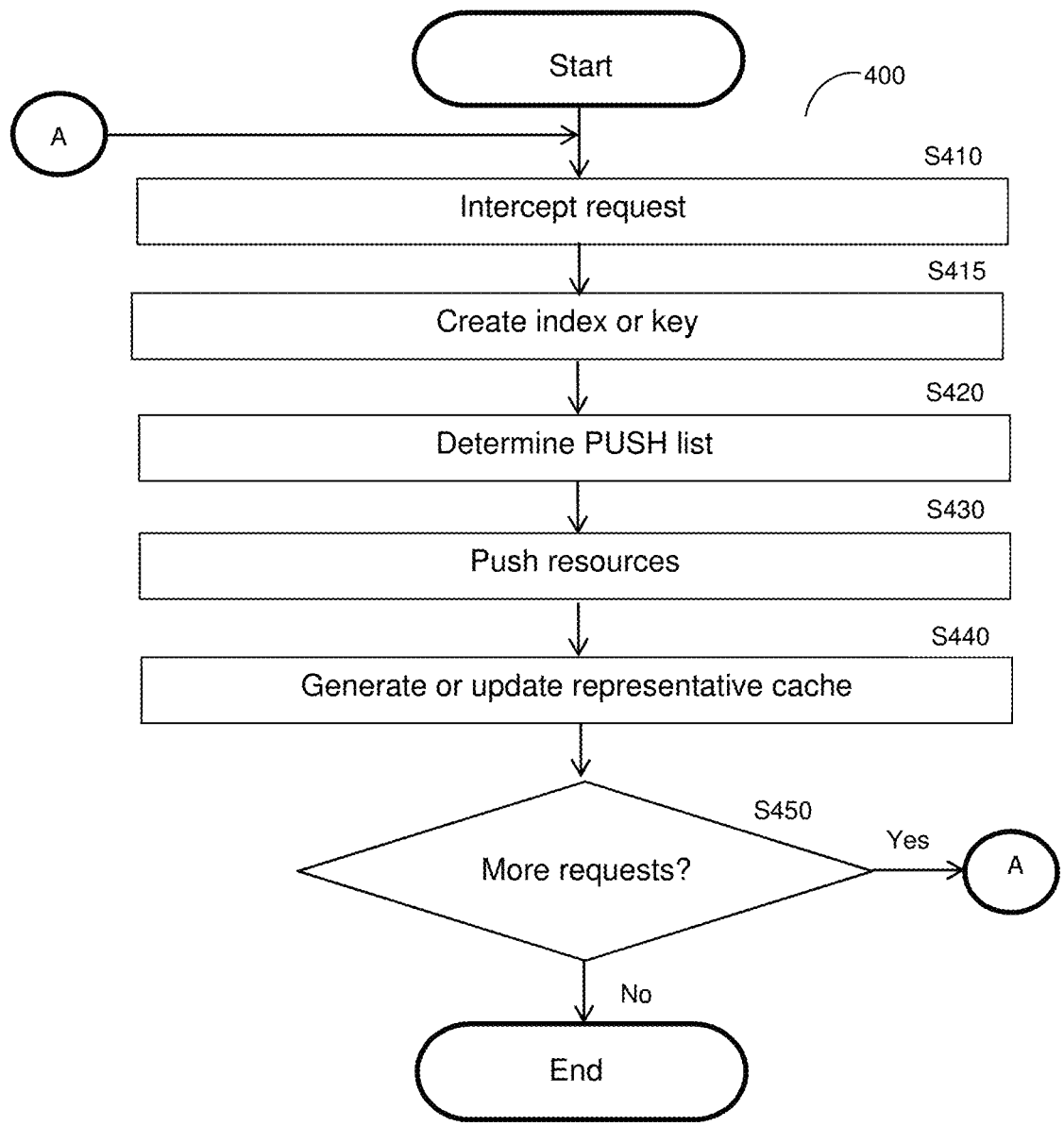
FIG. 4 is a flowchart illustrating a method for optimizing asynchronous resource pushing according to an embodiment.

FIG. 4 is an exemplary and non-limiting flowchart 400 illustrating a method for optimizing asynchronous resource pushing according to an embodiment. In an embodiment, the method may be performed by an acceleration engine (e.g., the acceleration engine 102). In a further embodiment, the method of FIG. 4 may be performed during an acceleration mode of the acceleration engine.

At S410, a request from a client device to an origin server is intercepted. The request includes a URL of a requested web page. At S415, the intercepted request is analyzed to create an index or classification key. As discussed above, the creation of index is based on data contained in the request or the context of the request.

At S420, a PUSH list is determined based on the intercepted request. In an embodiment, the determination of the PUSH list to be used to accelerate the response is based on the generated index. The PUSH list may be associated with the request, or may be associated with related requests. The related requests may be, e.g., requests having a matching index or key. The PUSH list includes metadata indicating resources to be pushed for the request. The determined PUSH list may be retrieved from a database based on, e.g., the request and/or the created index or key.

At S430, resources are pushed to the client device based on the PUSH list. The pushing may be based on one or more pushing mechanisms and, in particular, pushing mechanisms of HTTP 2.0 and SPDY®. In a non-limiting embodiment, Server Push may be utilized to push resources without requesting information from a client device. In an embodiment, S430 may further include determining a connection speed and/or a time for generating the response, and determining a number of resources to be pushed based on the determined connection speed and response generation time. The resources may be pushed according to a prioritized sequence defined by one or more order criteria for the response and/or the created index or key. Order criteria for pushing resources is defined further herein above with respect to FIG. 2.

In an embodiment, S430 may further include iteratively pushing resources indicated by the PUSH list and determining, for each iteration, whether the resource to be pushed should be pushed. Determining whether the resource should be pushed may be based on, but is not limited to, whether the cache of the client device likely includes the resource, whether a likelihood of performance improvement is above a predefined threshold, and so on. The likelihood that the client cache includes the resource may be further based on a Bloom filter or Page Transition Map. The Bloom filter or Page Transition Map may be used to determine which resources are likely in the client cache based on requests made during a current session and/or during previous sessions.

At optional S440, a representative cache may be generated and/or updated based on the pushing. The representative cache may indicate resources that are likely in the cache of the client device and may be determined based on, e.g., requests made by the client device during the current session. The requests may be utilized to determine navigations made by the client device for use with a Page Transition Map or to update a Bloom filter with hash values based on the requests.

At S450, it is determined if additional requests have been intercepted of if there are additional requests that should be processed and, if so, execution continues with S410; otherwise, execution terminates.

The various embodiments discussed herein have been described in connection with performance optimizations for HTML messages served over the Internet. However, one skilled in the art will recognize that the disclosed embodiments can also be applied to other forms of optimization and to systems using protocols other than HTTP. In addition, the disclosed embodiments are described herein as a mechanism for accelerating HTTP network traffic and client rendering of HTML. However, the disclosed embodiments can be used to achieve other optimization goals.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimization of resource pushing, comprising:

intercepting, at an acceleration engine connected between a client device and an origin server, a current request for web content from the client device, wherein the current request is directed to the origin server and is intercepted prior to reaching the origin server;

analyzing the current request to create an index for the current request;

determining, at the acceleration engine, a current PUSH list from at least one generated PUSH list based on the current request, wherein each generated PUSH list ensures availability of resources to the client device prior to receiving of a response, from the origin server, corresponding to the request, wherein the current PUSH list is determined further based on the created index; and pushing from the acceleration engine, in real-time, resources to the client device based on the determined PUSH list;

wherein the pushing of the resources ensures availability of at least one of the resources at the client device prior to the client device receiving a response, corresponding to the request, that was formulated external to the acceleration engine.

2. The method of claim 1, wherein the resources are pushed based on at least one logical criteria, wherein the at least one logical criteria is based on any of: a request, and a context.

3. The method of claim 1, wherein pushing the resources further comprises:
determining, for each resource to be pushed, whether the resource should be pushed, wherein the determination is based on any of: a likelihood that the cache of the client device includes the resource, and a likelihood of performance improvement resulting from pushing the resource.

4. The method of claim 3, wherein the likelihood that the cache of the client device includes the resource is based on any of: a Bloom filter, and a page transition map.

5. The method of claim 4, further comprising:
updating a representative cache based on the current request and the pushed resources, wherein determining whether each resource should be pushed is further based on the representative cache.

6. The method of claim 1, wherein the resources are pushed to the client device over a hypertext transfer protocol 2.0.

7. A non-transitory computer readable medium having stored thereon instructions for causing one or more processing units to execute the method according to claim 1.

8. An acceleration engine for optimization of resource pushing, comprising:
a processing circuitry; and
a memory, the memory containing instructions that, when executed by the processing circuitry, configure the acceleration engine to:
intercept, at the acceleration engine, which is connected between a client device and an origin server, a current request for web content from the client device, wherein the current request is directed to the origin server and is intercepted prior to reaching the origin server;
analyze the current request to create an index for the current request;
determine a current PUSH list from at least one generated PUSH list based on the current request, wherein each generated PUSH list ensures availability of resources to the client device prior to receiving of a response, from the origin server, corresponding to the request, wherein the current PUSH list is determined further based on the created index; and
push, in real-time, resources to the client device based on the determined PUSH list;
wherein the pushing of the resources ensures availability of at least one of the resources at the client device prior to the client device receiving a response, corresponding to the request, that was formulated external to the acceleration engine.

9. The acceleration engine of claim 8, wherein the resources are pushed based on at least one logical criteria, wherein the at least one logical criteria is based on any of: a request, and a context.

10. The acceleration engine of claim 8, wherein the acceleration engine is further configured to:
determine, for each resource to be pushed, whether the resource should be pushed, wherein the determination is based on any of: a likelihood that the cache of the client device includes the resource, and a likelihood of performance improvement resulting from pushing the resource.

11. The acceleration engine of claim 10, wherein the likelihood that the cache of the client device includes the resource is based on any of: a Bloom filter, and a page transition map.

12. The acceleration engine of claim 11, wherein the acceleration engine is further configured to:
update a representative cache based on the current request and the pushed resources, wherein determining whether each resource should be pushed is further based on the representative cache.

13. The acceleration engine of claim 8, wherein the resources are pushed to the client device over a hypertext transfer protocol 2.0.

14. The acceleration engine of claim 8, wherein the acceleration engine is part of a proxy device communicatively connected between the client and the origin server.

* * * * *